United States Patent [19]

Meyer

[11] 3,926,963

[45] Dec. 16, 1975

[54] NEW BENZOXAZOLYLSTILBENES AS OPTICAL BRIGHTENERS

[75] Inventor: Hans Rudolf Meyer, Binningen, Switzerland

[73] Assignee: Ciba-Geigy AG, Basel, Switzerland

[22] Filed: Apr. 20, 1973

[21] Appl. No.: 353,181

[52] U.S. Cl...... 260/240 CA; 106/176; 117/33.5 R; 117/33.5 T; 252/301.2 W; 260/37 NP; 260/37 R; 260/307 D; 260/544; 260/559 R; 260/575

[51] Int. Cl.² ......................................... C09D 23/00

[58] Field of Search ............................. 260/240 CA

[56] References Cited
UNITED STATES PATENTS

| 3,260,715 | 7/1966 | Saunders | 260/240 CA |
| 3,725,395 | 4/1973 | Siegrist et al. | 260/240 C |
| 3,781,278 | 12/1973 | Siegrist et al. | 260/240 CA |

FOREIGN PATENTS OR APPLICATIONS

| 1,072,916 | 6/1967 | United Kingdom | 260/240 CA |
| 1,378,454 | 10/1964 | France | 260/240 CA |
| 1,378,455 | 10/1964 | France | 260/240 CA |

Primary Examiner—John D. Randolph
Attorney, Agent, or Firm—Joseph G. Kolodny; Edward McC. Roberts; Prabodh I. Almaula

[57] ABSTRACT

The present invention provides new-4-benzoxazolyl-(2)-4'-phenyl-stilbenes which correspond to the formula

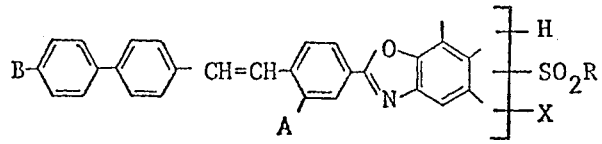

wherein R denotes optionally non-chromophorically substituted alkyl with 1 to 18, preferably 1 to 4, carbon atoms, alkenyl with 2 to 4 carbon atoms, cycloalkyl, preferably cyclohexyl, aryl or aralkyl, X denotes hydrogen, halogen, preferably chlorine, or alkyl with 1 to 4 carbon atoms, A denotes hydrogen, sulphamyl or halogen, preferably chlorine and B denotes hydrogen, halogen, preferably chlorine, alkyl or alkoxy with 1 to 4 carbon atoms.

These new compounds are useful optical brighteners, especially for high molecular synthetic organic materials.

4 Claims, No Drawings

NEW BENZOXAZOLYLSTILBENES AS OPTICAL BRIGHTENERS

The present invention relates to new 4-benzoxazolyl-(2)-4'-phenyl-stilbenes, their use for the optical brightening of organic materials, especially polyurethanes, polystyrene, polyacrylonitrile, cellulose acetates, polyesters, polyvinyl chloride and synthetic polyamides, and processes for their manufacture.

These new 4-benzoxazolyl-(2)-4'-phenyl-stilbenes correspond to the formula (1) 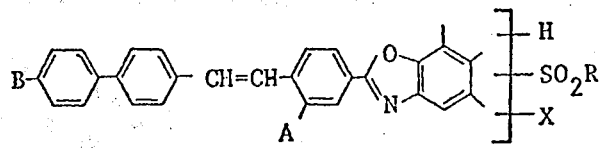

wherein R denotes optionally non-chromophorically substituted alkyl with 1 to 18, preferably 1 to 4, carbon atoms, alkenyl with 2 to 4 carbon atoms, cycloalkyl, preferably cyclohexyl, aryl or aralkyl, X denotes hydrogen, halogen, preferably chlorine, or alkyl with 1 to 4 carbon atoms, A denotes hydrogen, sulphamyl or halogen, preferably chlorine and B denotes hydrogen, halogen, preferably chlorine, alkyl or alkoxy with 1 to 4 carbon atoms.

As non-chromophoric radicals which can optionally be present as substituents of an alkyl radical R, there should above all be mentioned hydroxyl, nitrile, chlorine, sulpho, carboxyl, alkoxy with 1 to 18, preferably 1 to 4, carbon atoms, aryloxy, aralkoxy, alkenyloxy, carbalkoxy with 2 to 19, preferably 2 to 5, carbon atoms, carbaryloxy and carbaralkyloxy. Examples of such substituted alkyl radicals are 2-hydroxyethyl, 2,3-dihydroxypropyl, —CH$_2$COOCH$_2$C$_6$H$_5$, —CH$_2$COOC$_6$H$_5$, —CH$_2$CH$_2$COOCH$_2$C$_6$H$_5$, —CH$_2$CH$_2$COOC$_6$H$_5$, carbalkyloxy(1-4C)methyl, carbalkoxy(1-4C)-ethyl, cyanomethyl, cyanoethyl, alkoxy(1-4)ethyl, phenoxyethyl, benzyloxyethyl, vinyloxyethyl, dichloromethyl, 2-sulphoethyl, 3-sulphopropyl and 4-sulphobutyl (or their salts, such as sodium, potassium or ammonium salts).

Preferred aryl radicals R are phenyl or diphenylyl optionally substituted by non-chromophoric groups. Possible non-chromophoric substituents are here above all alkyl or alkoxy with 1 to 4 carbon atoms, as well as halogen, preferably chlorine. The number of these non-chromophoric substituents per phenyl radical generally does not exceed the number 2.

Aralkyl radicals are in general phenylalkyl with 1 to 4 carbon atoms in the alkyl part which is optionally substituted in the phenyl ring by halogen, preferably chlorine, alkyl or alkoxy with 1 to 4 carbon atoms, such as benzyl, chlorobenzyl, dichlorobenzyl and also diphenylmethyl and triphenylmethyl.

Vinyl, allyl, methallyl and crotyl may be mentioned as examples of alkenyl radicals.

By the term sulphamyl there are to be understood, in the text which follows, both the unsubstituted groups and the groups monosubstituted or disubstituted at the nitrogen. Preferred substituents are here alkyl or hydroxyalkyl with 1 to 4 carbon atoms and also alkylene with 4 to 6 carbon atoms optionally interrupted by an oxygen or —NH— bridge, a heterocyclic structure containing 5 to 7 ring members, such as pyrrolidino, piperidino, morpholino or hexamethyleneimino being formed with inclusion of the amide nitrogen.

In the formula (1) A and B preferably represent hydrogen, whilst the group —SO$_2$R is preferably in the 6-position and especially in the 5-position of the benzoxazole radical.

Within the scope of the formula (1), compounds to be singled out are those of the formula (2) 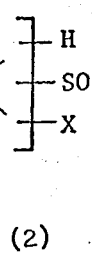

wherein R$_1$ denotes optionally chlorine-substituted alkyl with 1 to 6 carbon atoms, phenyl which is optionally substituted by alkyl with 1 to 4 carbon atoms or chlorine, or benzyl which is optionally substituted in the phenyl part by alkyl with 1 to 4 carbon atoms or chlorine, and X$_1$ denotes hydrogen, chlorine or methyl.

Compounds of particular practical interest are those of the formula (3) 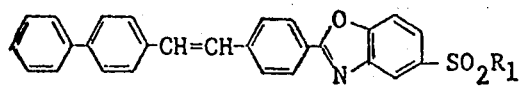

wherein R$_1$ denotes optionally chlorine-substituted alkyl with 1 to 4 carbon atoms, phenyl which is optionally substituted by alkyl with 1 to 4 carbon atoms or chlorine, or benzyl which is optionally substituted in the phenyl part by alkyl with 1 to 4 carbon atoms or chlorine, and (3a) 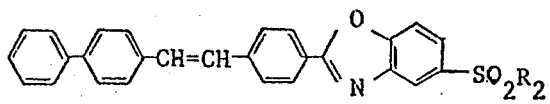

wherein R$_2$ denotes methyl, ethyl, phenyl or benzyl.

The benzoxazolyl-stilbenes characterised above can be manufactured according to various processes which are in themselves known.

According to a preferred process, a compound of the formula (4) 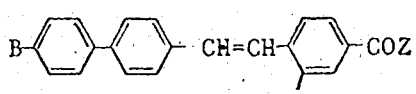

wherein A and B have the indicated meaning and Z represents hydrozyl, chlorine, bromine or alkoxy with 1 to 4 C atoms, and an o-aminophenol of the formula (5) 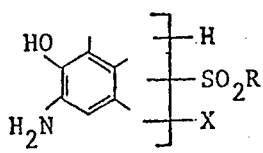

wherein R and X have the indicated meaning, are reacted to give an amide of the formula (6) 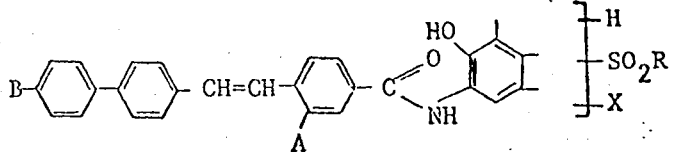

and this amide is then cyclized to give a compound of the formula (1) or of subordinate formulae.

The acylation is appropriately carried out at temperatures of 20° to 220°C, preferably in an organic solvent which is inert towards the reactants.

When using stilbenecarboxylic acid halides, the hydrogen halide liberated can be removed, for example with the aid of a stream of dry nitrogen; frequently, however, it is desirable to add an inert tertiary amine such as pyridine, picolines, quinoline, triethylamine, N,N-dimethylaniline and the like in order to bind the hydrogen halide liberated, or to carry out the acylation in an inert tertiary amine. The cyclisation reaction is then carried out at temperatures of 120° to 350°C, preferably in the presence of a high-boiling inert organic solvent and optionally of a catalyst, advantageously whilst passing in a stream of inert gas, for example nitrogen, to remove the water formed in the reaction.

As organic solvents, largely the same substances can be used for both steps, for example optionally halogenated or nitrated hydrocarbons such as toluene, xylene, chlorobenzene, dichlorobenzene, trichlorobenzene, chlorinated biphenyl, nitrobenzene or nitrotoluene, dioxane, dimethylformamide or dimethylacetamide, dimethylsulphoxide, N-methylpyrrolidone, tetramethylenesulphone, phosphoric acid tris-(dimethylamide), optionally etherified hydroxy compounds, such as propylene glycol, ethylene glycol monomethyl ether, diethylene glycol monobutyl ether or diethylene glycol diethyl ether and high-boiling esters of phthalic acid, such as phthalic acid dibutyl ester.

Examples of suitable catalysts are boric acid, boric anhydride, boron trifluoride, zinc chloride, p-toluenesulphonic acid, phosphorus oxychloride, thionyl chloride and also polyphosphoric acids, including pyrophosphoric acid.

The synthesis of compounds according to the general formula (1) and subordinate formulae can in principle also be carried out in a one-step process, starting from compounds of the formula (4) and o-aminophenols of the formula (5), by heating these components together to elevated temperatures, appropriately between 120° and 350°C, in the melt or in a solvent which at the same time acts as the condensation agent, such as polyphosphoric acid or fused zinc chloride.

Instead of the aminophenols of the formula (5) it is also possible to employ their oxazolones of the formula (5a) 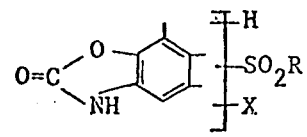

Another manufacturing process for compounds of the formula (1), which is advantageous in many cases, consists of the condensation of o-halogenoanilines with a compound of the formula (4) according to the equation

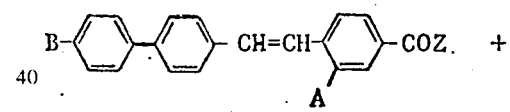

(4)

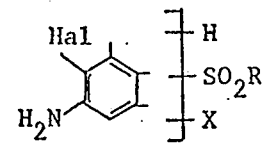

(5b)

in accordance with methods which are in themselves known, to give the corresponding acid amide of the formula (6a)

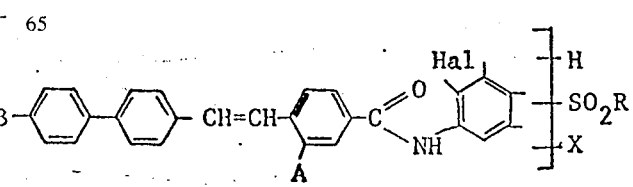

and subsequent cyclization to give the corresponding benzoxazolyl derivative. The cyclization reaction is here carried out in the presence of polar solvents which are chemically inert towards the reactants and also in the presence of agents which bind hydrogen halide, and of copper catalysts. In the above formulae, Hal here denotes chlorine or bromine, whilst all the other symbols have the meaning indicated above.

As examples of polar solvents which are chemically inert towards the reactants there may be mentioned dimethylformamide, dimethylsulphoxide, N-methylpyrrolidone or nitrobenzene. As agents which bind hydrogen halide there may be mentioned: alkali metal acetate, magnesium oxide, organic bases such as pyridine and the like. By way of examples, copper-I chloride, copper-II chloride, copper acetate, copper oxides, elementary finely divided copper and the like may be mentioned as copper catalysts.

According to another process for the manufacture of the compounds according to the invention, a biphenyl-4-aldehyde of the formula (7) 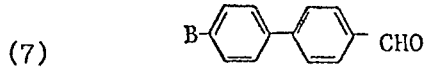

wherein B has the indicated meaning, or a functional derivative thereof, such as, for example, an oxime, hydrazone or anil is condensed, at temperatures of 20° to 200°C, in the presence of a catalyst, with a compound of the formula (8) 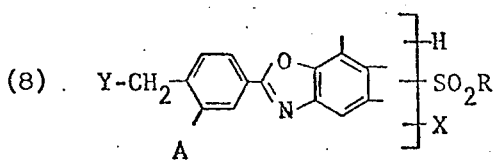

wherein A, R and X have the indicated meaning and Y represents hydrogen, carboxyl, carbalkoxy with 2 to 5 carbon atoms, nitrile or dialkyl(1-4C)phosphono (Horner synthesis), optionally with subsequent removal of the radical Y, unless it has already been split off during the condensation. Examples of suitable catalysts are boric acid, zinc chloride, acetic anhydride, p-toluenesulphonic acid, alkali metal acetates, alkali metal hydroxides or alkaline earth metal hydroxides, piperidine, alkali metal alcoholates or alkaline earth metal alcoholates and the like.

The reaction can be carried out in the melt but preferably in a solvent which is inert towards the reactants. The solvents used are generally the same as in the reactions discussed above.

The compounds of the formula (1) and subordinate formulae can be isolated from the particular reaction mixtures, after completion of the reaction, by customary methods such as filtration, if necessary after precipitation by means of suitable reagents or after evaporation of the solvent.

The compounds of the formulae (4), (5), (7) and (8) required as starting materials are known or are manufactured according to processes which are in themselves known.

Compounds of the formula (4) are obtained, for example, by condensation of a compound of the formula (7) with a p-toluic acid ester or with a p-(dialkyl-phosphonomethyl)benzoic acid ester, optionally followed by saponification of the ester group and optionally followed by conversion of the carboxyl group into the acid chloride, for example by means of thionyl chloride. Compounds of the formula (8) are manufactured, for example, by condensation of an aminophenol of the formula (5) with p-toluic acid chloride according to the methods described above, optionally followed by modification of the methyl group.

The 2-aminoalkylsulphonyl-phenols used as starting products can, for example, be manufactured as follows:

4-Chloro-alkylsulphones are nitrated in the 3-position (U.S. Pat. No. 2,938,042; British Pat. No. 467,549), the chlorine is saponified with sodium hydroxide solution and the nitro group is reduced (British Pat. No. 647,168). It is also possible to reduce benzoxazolone-sulphonyl chloride with sodium sulphite to give the sulphinic acid, to alkylate the latter with lower dialkyl sulphates or alkyl halides and to saponify the resulting alkylsulphonylbenzoxazolones with sodium hydroxide solution (D. Simov et al. C.A. 66 (1967) 115,401 m). This process is also particularly suitable for the manufacture of 5- or 6-alkylsulphonyl-2-aminophenols. The synthesis of 2-amino-4-chloromethylsulphonylphenol takes place similarly to the methods first described (British Pat. No. 720,251).

The arylsulphonyl-aminophenols are obtained, for example, according to examples in British Pat. No. 743,907 by Friedel-Crafts reaction of 4-chloro-3-nitrobenzenesulphonyl chloride with the appropriate aromatic compounds (benzene, toluene, xylene, mesitylene and the like), wherein, for example in the case of toluene or m-xylene, the condensation can take place predominantly in the 4-position, but alongside this also in the 2-position. In the case of chlorobenzene (J. D. Loudon, T. D. Robson, J. Chem. Soc. 1937 242–246) or toluene (J. D. Loudon, J. Chem. Soc. 1936 218–222), anhydrous iron chloride is advantageously used as the catalyst instead of aluminium chloride, and less than molar amounts relative to sulphonyl chloride also suffice. The 4-chloro-3-nitrophenylarylsulphones obtained are then converted into the corresponding aminophenols analogously to the 4-chloro-3-nitrophenylalkylsulphones.

2-Amino-aralkylsulphonyl-phenols are obtained in a similar manner to the 2-amino-alkylsulphonylphenols (British Pat. No. 743,907). For example, 4-chloro-3-nitrobenzenesulphinic acid is heated with benzyl chloride (slight excess) to 80°–85°C whilst constantly neutralizing the hydrochloric acid formed with sodium hydroxide solution, and the resulting 4-chloro-3-nitrophenyl-benzylsulphone is converted into the corresponding aminophenol as previously described.

The melting points of some aminophenols and of their starting products and intermediate products for their manufacture are listed in Table A.

Table A

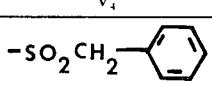

| V₁ | V₂ | V₄ | Melting point |
|---|---|---|---|
| Cl | NO₂ | 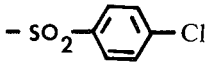 -SO₂CH₂—⟨phenyl⟩ | 138°C |
| OH | " | " | 174°C |
| " | NH₂ | " | 186°C |
| OH | NO₂ | -SO₂—⟨phenyl⟩—Cl | 193°C |
| " | NH₂ | " | 185°C |
| OH | NO₂ | —SO₂—CH₂CH₂CH₃ | 100°C |
| " | NH₂ | " | 140°C |
| Cl | NO₂ | 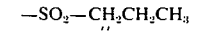 -SO₂—⟨phenyl with CH₃, CH₃⟩ | 123°C |
| OH | " | " | 105°C |
| " | NH₂ | " | approx. 156°C |
| Cl | NO₂ | 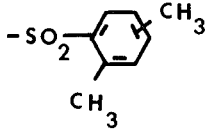 -SO₂—⟨phenyl-CH₃⟩ | 90°C |
| OH | " | " | 110°C |
| " | NH₂ | " | |
| Cl | NO₂ | 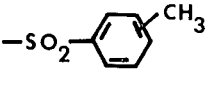 -SO₂—⟨phenyl with CH₃, CH₃, CH₃⟩ | 156°C |
| OH | " | " | 171°C |
| " | NH₂ | " | 187°C |
| Cl | NO₂ | 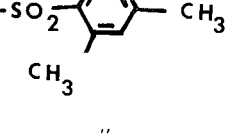 -SO₂-CH₂—⟨phenyl⟩—Cl | 145°C |
| OH | " | " | 197°C |
| " | NH₂ | " | 217°C |
| Cl | NO₂ | —SO₂—CH(CH₃)₂ 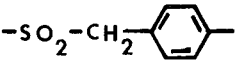 | 62°C |
| OH | " | " | 113°C |
| " | NH₂ | " | 127°C |

The new compounds defined above show a more or less pronounced fluorescence in the dissolved or finely divided state. They can be used for the optical brightening of synthetic and semi-synthetic organic materials or substances which contain such organic materials.

The following groups of organic materials, where optical brightening thereof is relevant, may be mentioned as examples of the above, without the survey given below being intended to express any restriction thereto:

I. Synthetic organic high molecular materials:

a. Polymerization products based on organic compounds containing at least one polymerizable carbon-carbon double bond, that is to say their homopolymers or copolymers as well as their after-treatment products such as, for example, cross-linking, grafting or degradation products, polymer blends or products obtained by modification of reactive groups, for example polymers based on α,β-unsaturated carboxylic acids or derivatives of such carboxylic acids, especially on acrylic compounds (such as, for example, acrylic esters, acrylic acid, acrylonitrile, acrylamides and their derivatives or their methacryl analogues), on olefine hydrocarbons (such as, for example, ethylene, propylene, styrenes or dienes and also so-called ABS polymers), and polymers based on vinyl and vinylidene compounds (such as, for example, vinyl chloride, vinyl alcohol and vinylidene chloride), b. Polymerization products such as are obtainable by ring opening, for example polyamides of the polycaprolactam type, and also polymers which are obtainable both via polyaddition and via polycondensation, such as polyethers or polyacetals.

c. Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyester) or unsaturated (for example maleic acid-dialcohol polycondensates as well as their crosslinking products with copolymerisable vinyl monomers), unbranched and branched (also including those based on polyhydric alcohols, such as, for example alkyd resins), polyesters, modified polyesters (for example with anionic groups), polyamides (for example hexamethylenediamine adipate, maleate resins, melamine resins, their precondensates and analogues, polycarbonates and silicones, d. Polyaddition products such as polyurethanes (cross-linked and non-crosslinked) and epoxide resins.

II. Semi-synthetic organic materials, for example cellulose esters of varying degrees of esterification (so-called 2½ acetate or triacetate) or cellulose ethers, regenerated cellulose (viscose or cuprammonium cellulose), or their after-treatment products, and casein plastics.

Preferred substrates are polyurethanes, polystyrene, polyacrylonitrile, cellulose acetate and especially polyamides, polyvinyl chloride and polyester.

The organic materials to be optically brightened can be in the most diverse states of processing (raw materials, semi-finished goods or finished goods). On the other hand, they can be in the form of structures of the most diverse shapes, that is to say for example predominantly three-dimensional bodies such as sheets, profiles, injection mouldings, various machined articles, chips, granules or foams, and also as predominantly two-dimensional bodies such as films, foils, lacquers, coatings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks and flocked structures.

The new optical brighteners according to the present invention can further be added to, or incorporated in, the materials before or during their shaping. Thus they can, for example, be added to the compression moulding composition or injection moulding composition during the manufacture of films, sheets (for example, hot milling into polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerization, polycondensation or polyaddition, Powdering onto polymer chips or granules for spinning compositions, Bath dyeing of polymer chips or granules for spinning compositions, Metered addition to spinning melts or spinning solutions and Application to the tow before stretching.

The new optical brighteners according to the present invention can, for example, also be employed in the following use forms:

a. Mixed with dyestuffs (shading) or pigments (colored pigments or especially, for example, white pigments),
b. Mixed with so-called "carriers," plasticizers, antioxidants, light protection agents, heat stabilizers and the like.
c. Incorporation of the optical brighteners into polymeric carriers (polymerization, polycondensation or polyaddition products), in a dissolved or dispersed form, for use, for example, in coating agents, impregnating agents or binders (solutions, dispersions and emulsions),
d. In combination with other optically brightening substances,
e. In spinning bath preparation, that is to say as additives to spinning baths such as are used for improving the slip for the further processing of synthetic fibres, or from a special bath before the esterification of the fibre.

The incorporation of the brighteners according to the invention into polyvinyl chloride and especially into polyester spinning compositions is to be singled out. Here the preferred polyester is polyethylene glycol terephthalate.

The amount of the new optical brighteners to be used according to the invention, relative to the material to be optically brightened, can vary within wide limits. A distinct and durable effect is already achieved with very small amounts, in certain cases, for example, amounts of 0.001 percent by weight. However, amounts of up to about 0.1 percent by weight and optionally of up to about 0.2 percent by weight can be employed. For most practical purposes, amounts between 0.01 and 0.2 percent by weight are of preferred interest.

In the examples, parts, unless otherwise stated, always denote parts by weight and percentages always percentages by weight. Unless otherwise noted, melting points and boiling points are uncorrected.

EXAMPLE 1

12.0 g of the acid chloride of the formula (9) $\langle\bigcirc\rangle-\langle\bigcirc\rangle-CH=CH-\langle\bigcirc\rangle-COCl$ and 7.4 g of 2-amino-4-methylsulphonyl-phenol in 100 ml of dry trichlorobenzene are heated to 150°C for 15 minutes. Hereupon, the acid amide of the formula (10)

separates out in a voluminous form. After adding 100 ml of chlorinated biphenyl (containing 21% of chlorine, "Aroclor 1221" from Monsanto), the mixture is heated to the boil whilst passing in nitrogen, and 150 ml of solvent and water of the reaction are distilled off over the course of about 2 hours. At the same time the temperature rises to approx. 285°C and the acid amide dissolves completely whilst undergoing cyclisation to give the end product. After cooling, the product which has crystallized is filtered off, repeatedly washed with toluene and dried. 13.3 g of the compound of the formula (11)

are obtained, which after recrystallization from dimethylformamide and dichlorobenzene assumes the form of light yellow crystals and melts, though not sharply, at 292°C.

EXAMPLE 2

IF the procedure described in Example 1 is followed but 2-amino-4-ethylsulphonyl-phenol is used as the aminophenol component, the benzoxazole of the formula (12)

is obtained, which after repeated recrystallization from dimethylformamide and chlorobenzene melts, though not sharply, at about 245°C.

EXAMPLE 3

6.4 g of 4-phenylstilbene-4'-carboxylic acid chloride are added to a solution of 5.8 g of 2-amino-4-tolylsulphonylphenol (mixture of o- and predominantly p-tolyl isomer) in 40 ml of pyridine, and the mixture is heated for approx. 1 hour under reflux. The bulk of the solvent is stripped off in vacuo and the residue is boiled up in 80 ml of alcohol. After cooling to room temperature, the product which has precipitated is filtered off, washed with alcohol and dried. 10.4 g of acid amide of melting point 251°C (decomposition) are obtained.

The product, in 9.1 ml of phosphorus oxychloride and 40 ml of o-dichlorobenzene, is heated under reflux until the evolution of hydrogen chloride has ceased. The solvent is distilled off in vacuo, the residue is boiled up in 50 ml of methylcellosolve and allowed to cool, and the precipitate is filtered off. After drying, 9.8 g of the compound of the formula

(13) 
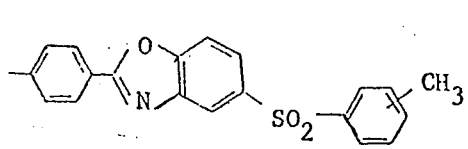

are obtained as a mixture of 2 isomers, wherein the methyl group is in the o-position and predominantly in the p-position, in the form of pale yellow crystals of melting point 303°–305°C (after recrystallization from N-methylpyrrolidone and boiling with alcohol).

The compound of formula

(14) 
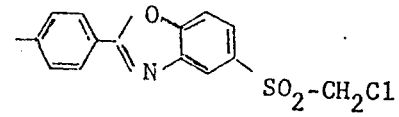

melting point 251°C after recrystallization from dioxane and o-dichlorobenzene, is obtained analogously.

EXAMPLE 4

8.1 g of 2-amino-4-benzylsulphonyl-phenol are reacted analogously to Example 3 with 9.6 g of 4-phenyl-stilbene-4'-carboxylic acid chloride (melting point 220°–225°C), the residue obtained after evaporation of the pyridine being extracted with methanol instead of ethanol. The resulting acid amide (15.0 g, melting point 278°–281°C) is stirred with 60 ml of chlorinated biphenyl (21% Cl, Aroclor 1221) at the boil, whilst passing in nitrogen, 10 ml of solvent and water of condensation being distilled off over the course of about 2 hours. After cooling, the product which has precipitated is filtered off, repeatedly washed with toluene and methanol and dried. 11.4 g of the compound of the formula

(15) 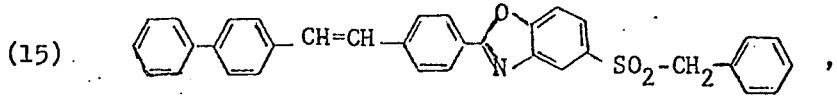

melting point 315°C after recrystallization from dimethylformamide and o-dichlorobenzene, are obtained.

Analogously, there are obtained the compounds listed in Table I, of the general formula

Table I

(16) 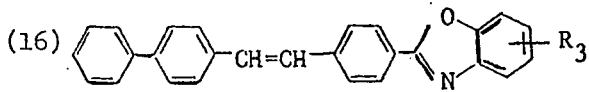

| Formula No. | $R_3$ | Melting point | Recrystallised from |
|---|---|---|---|
| (17) | 6—$SO_2$—$CH_3$ | 292°C | DMF, dichlorobenzene |
| (18) | 5-$SO_2$-⟨⟩-Cl | 300°C | DMF, dichlorobenzene |
| (19) | 5—$CH_2CH_2CH_3$ | 253°C | Chlorobenzene, dioxane |

2-Amino-5-methylsulphonyl-phenol, the intermediate product for the compound of the formula (17), can be manufactured as follows:

The moist sulphochloride of the formula

(20) 

obtained by sulphochlorination of 350 g of 1,3-benzoxazolone is introduced in portions, at 5°–10°C (cooling) into a well-stirred solution of 164.2 g of sodium sulphite in 1.5 l of water whilst simultaneously adding dropwise 10% strength aqueous sodium hydroxide solution (approx. 1,150 ml), whereby the pH is constantly kept at 8. After the main reaction has subsided, the mixture is additionally warmed to 55°C for 30 minutes (whilst adding further sodium hydroxide solution), the solution is cooled and acidified with 200 ml of concentrated hydrochloric acid and the product which has precipitated is filtered off and washed with ice water. After drying in a high vacuum at 50°C, 134.4 g of the crude sulphinic acid of the formula

(21) 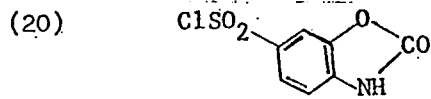

melting point 156°–158°C (after recrystallization from water) are obtained.

95.5 ml of dimethyl sulphate are added to a suspension of 99.6 g of the crude sulphinic acid of the formula (21) in 250 ml of acetone and 150 ml of water, and the mixture is stirred for 40 minutes at 40°C. The acid liberated by the reaction is continuously neutralised at 40°C by dropwise addition of 30% strength sodium hydroxide solution (approx. 120 ml), so that the pH constantly remains between 3.5 and 4. In the course thereof, the starting product dissolves completely, after which the reaction product crystallises out. After completion of the reaction, the pH is adjusted to 6 and the acetone is stripped off in vacuo. The precipitate is filtered off, washed with water and dried. 68.0 g of crude methylsulphone of the formula

(22) 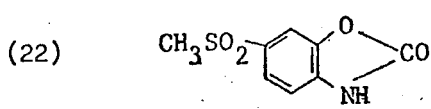

of melting point 267°–269°C (after two recrystallizations from methanol-water), are obtained.

12.6 g of crude methylsulphone of the formula (22) in 30 ml of 30% strength sodium hydroxide solution and 25 ml of water and heated for 2 hours under reflux. 10 ml of water are distilled off, the residue is again diluted with 10 ml of water and the cooled solution is neutralized with concentrated hydrochloric acid to pH 6 – 7 (evolution of $CO_2$). After cooling to 0°C, the precipitate is filtered off, washed with ice water and dried. 7.7 g of aminophenol of the formula

(23) 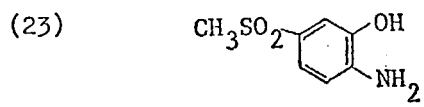

of melting point 195°–197°C (in the form of small needles after recrystallization from water), are obtained.

(24) 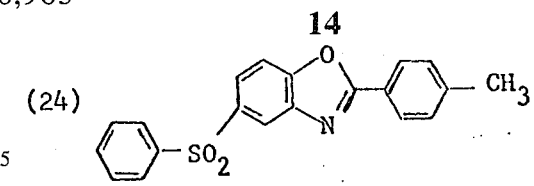

of melting point 198°C (recrystallized from methylcellosolve and toluene), are obtained.

A solution of 2.6 ml of bromine in 40 ml of chlorobenzene is added dropwise over the course of 2½ hours to a solution of 17.5 g of the compound of the formula (24) in 160 ml of chlorobenzene, at the reflux temperature, whilst irradiating with UV. After addition of the bromine, the solution is kept under reflux for a further hour, until the evolution of hydrogen bromide has ceased, and approx. 130 ml of solvent are distilled off. The solution is allowed to cool and the product which has precipitated is filtered off, washed with alcohol and dried. 17.9 g of the compound of the formula

(25) 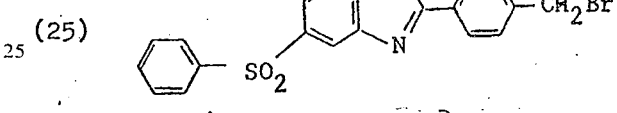

of melting point 200°C (recrystallized from toluene), are obtained.

A mixture of 17.1 g of the unpurified compound of the formula (25) and 13 ml of triethylphosphite is carefully heated to 150°C whilst stirring and the ethyl bromide which is split off is distilled off through a column. The solution is kept at this temperature for about 4 hours and the excess triethylphosphite is distilled off in vacuo. The resulting crude oily phosphonate of the formula

(26) 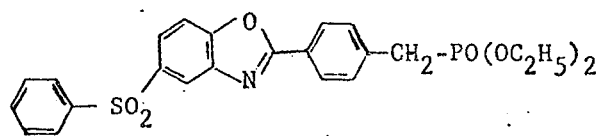

EXAMPLE 5

A solution of 30.9 g of p-toluic acid chloride in 250 ml of trichlorobenzene is added to a solution of 49.8 g of 2-amino-4-phenylsulphonyl-phenol in 150 ml of pyridine. The solution is heated for 1 hour under reflux, about 250 ml of solvent are distilled off, in the course of which the temperature rises to 205°C, and the mixture is then kept for one-half hour at this temperature. After cooling to 90°C, 100 ml of alcohol are added, the mixture is further cooled to 10°C and the product which has precipitated is filtered off, washed three times with 30 ml of methanol at a time and dried. 61.0 g of the compound of the formula is cooled to room temperature and then stirred into 50 ml of dimethylformamide, and 9.1 g of biphenylaldehyde are added, followed by 3.5 g of sodium methylate added in 3 portions over the course of 1/4 hour whilst taking care that the temperature does not exceed 40°C. The mixture is stirred for 2 hours at 40°–45°C and cooled to room temperature, and the product which has precipitated is filtered off, washed with 20 ml of dimethylformamide and with methanol and dried. 17.1 g of the compound of the formula

(27) 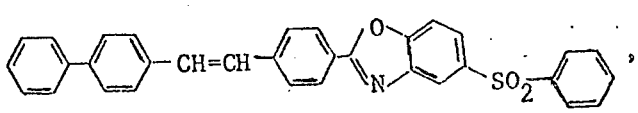

which crystallizes from dimethylformamide and dichlorobenzene in pale yellow glistening flakes of melting point 290°C, are obtained.

EXAMPLE 6

The compounds of the general formula

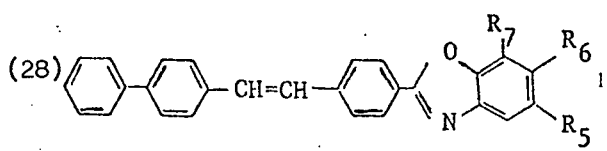

listed in Table II can be manufactured (at times as mixtures) in accordance with Example 3 or 4.

Table II

| Compound of the formula | $R_5$ | $R_6$ | $R_7$ |
|---|---|---|---|
| (29) | isopropyl-sulphonyl | H | H |
| (30) | n-butyl-sulphonyl | H | H |
| (31) | isobutyl-sulphonyl | H | H |
| (32) | sec.-butyl-sulphonyl | H | H |
| (33) | H | $-SO_2-C_2H_5$ | H |
| (34) | o-chlorobenzyl-sulphonyl | H | H |
| (35) | m-methylbenzyl-sulphonyl | H | H |
| (36) | p-ethylphenyl-sulphonyl | H | H |
| (37) | o-ethylphenyl-sulphonyl | H | H |
| (38) | p-isopropylphenyl-sulphonyl | H | H |
| (39) | o-isopropylphenyl-sulphonyl | H | H |
| (40) | 2,4-dimethylphenyl-sulphonyl | H | H |
| (41) | 2,6-dimethylphenyl-sulphonyl | H | H |
| (42) | 2,4,6-trimethylphenyl-sulphonyl | H | H |
| (43) | $-SO_2CH_3$ | H | Cl |
| (44) | $-SO_2CH_3$ | H | $CH_3$ |
| (45) | Cl | | $-SO_2-CH_3$ |
| (46) | Cl | H | benzyl-sulphonyl |
| (47) | Cl | H | phenyl-sulphonyl |

EXAMPLE 7

100 parts of terephthalic acid ethylene glycol polyester granules are intimately mixed with 0.05 part of one of the compounds of the formulae (11), (12), (13), (14), (15), (17), (18), (19) or (27) and the mixture is fused at 285°C whilst stirring. After spinning the spinning compositions through customary spinnerets, strongly brightened polyester fibres of good fastness to light are obtained.

EXAMPLE 8

An intimate mixture of 100 parts of polyvinyl chloride, 3 parts of stabilizer (Advastat BD 100; Ba/Cd complex), 2 parts of titanium dioxide, 59 parts of dioctyl phthalate and 0.01 to 0.2 part of one of the compounds of the formulae (11), (12), (13), (14), (15), (17), (18), (19) or (27) is milled on a calender at 150°–155°C to give an opaque sheet. This has a substantially higher degree of whiteness than a sheet which does not contain the optical brightener.

EXAMPLE 9

A casting composition of 10 g of polyacrylonitrile, 0.2 g of titanium dioxide (anatase modification) as the delustering agent and 40 ml of dimethylformamide, which contains 5 mg of one of the compounds of the formulae (12), (13), (14), (15), (17), (19) or (27), is cast on a glass plate and spread by means of a metal rod to form a thin film. After drying, the film is strongly brightened.

EXAMPLE 10

A 27% strength casting composition of polyurethane in ethyl acetate which contains — relative to the dry weight of the plastic — 2% of titanium dioxide (anatase modification), 5% of a stabilizer and 5% of a catalyst, and 0.05% of a compound of the formulae (12), (14), (17), (19) or (27), is cast on a glass plate and spread by means of a metal rod to form a thin film. After drying, the film is strongly brightened.

EXAMPLE 11

10,000 parts of granulated polyamide-6 are mixed with 30 parts of titanium dioxide (rutile modification) and 2 parts of one of the compounds of the formulae (12), (13), (14), (15), (17), (18), (19) or (27) in a tumbler vessel for 12 hours. The mixture is fused whilst excluding atmospheric oxygen and the melt is spun in the usual manner. The resulting filaments are strongly brightened.

EXAMPLE 12

A 13% strength casting composition of acetylcellulose in acetone which contains — relative to the dry weight of plastic — 2% of anatase (titanium dioxide) as the delustering agent, and 0.04% of one of the compounds of the formulae (12), (14), (17) or (19), is cast on a glass plate and spread by means of a metal rod to form a thin film. After drying, the film shows a substantially higher degree of brightness than a film manufactured in the same way, which does not contain an optical brightener.

EXAMPLE 13

100 parts of polystyrene and 0.1 part of one of the compounds of the formulae (14), (18) or (19) are fused, whilst excluding air, for 20 minutes at 210°C in a tube of 1 cm diameter. After cooling, an optically brightened polystyrene composition of good fastness to light is obtained.

EXAMPLE 14

A polyester fabric (for example "Dacron") is padded at room temperature with an aqueous solution which contains, per liter, 2 g of one of the compounds of the formulae (11), (12), (13), (14), (15), (18), (19) or (27) and 1 g of an addition product of about 8 mols of ethylene oxide to 1 mol of p-tert.-octylphenol, and is dried at about 70° to 80°C. The dry material is subsequently briefly subjected to a heat treatment at 220°C. The material treated in this way is strongly brightened and shows good fastness to light.

If instead of the polyester fabric described above a fabric of a polyester manufactured by co-condensation with 2–5 mol% of 5-(sodium sulphonate)-isophthalic acid (Dacron 64) is used, a strong brightening of good fastness to light is again obtained.

I claim:

1. A benzoxazolylstilbene of the formula

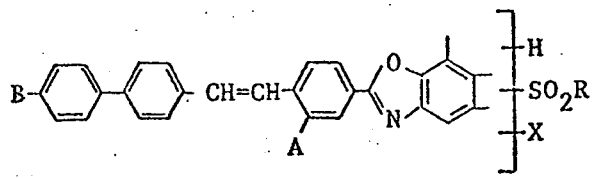

wherein R denotes unsubstituted or non-chromophorically substituted alkyl with 1 to 18 carbon atoms, alkenyl with 2 to 4 carbon atoms, cycloalkyl, aryl or aralkyl, X denotes hydrogen, halogen or alkyl with 1 to 4 carbon atoms, A denotes hydrogen, sylphamyl or halogen and B denotes hydrogen, halogen, alkyl or alkoxy with 1 to 4 carbon atoms.

2. A benzoxazolylstilbene according to claim 1, corresponding to the formula

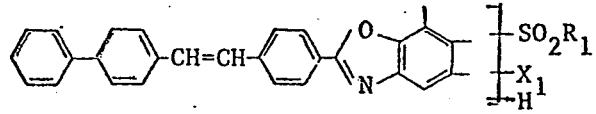

wherein $R_1$ denotes unsubstituted or chlorine-substituted alkyl with 1 to 6 carbon atoms, phenyl which is optionally substituted by alkyl with 1 to 4 carbon atoms or chlorine, or benzyl which is unsubstituted or substituted in the phenyl part by alkyl with 1 to 4 carbon atoms or chlorine, and $X_1$ denotes hydrogen, chlorine or methyl.

3. A benzoxazolylstilbene according to claim 1, corresponding to the formula

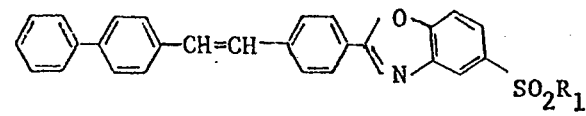

wherein $R_1$ denotes unsubstituted or chlorine-substituted alkyl with 1 to 4 carbon atoms, phenyl which is optionally substituted by alkyl with 1 to 4 carbon atoms or chlorine, or benzyl which is unsubstituted or substituted in the phenyl part by alkyl with 1 to 4 carbon atoms or chlorine.

4. A benzoxazolylstilbene according to claim 1, corresponding to the formula

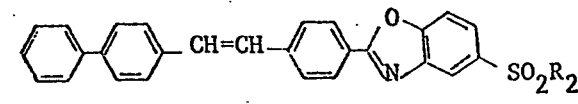

wherein $R_2$ denotes methyl, ethyl, phenyl or benzyl.

* * * * *

UNITED STATES PATENT AND TRADEMARK OFFICE
CERTIFICATE OF CORRECTION

PATENT NO. : 3,926,963
DATED : December 16, 1975
INVENTOR(S) : Hans Rudolf Meyer It is certified that error appears in the above-identified patent and that said Letters Patent are hereby corrected as shown below:

Column 12, line 21, formula #(19), in Table I, delete "5-$CH_2CH_2CH_3$" and substitute -- 5-$SO_2CH_2CH_2CH_3$ --.

Signed and Sealed this

Twenty-fifth Day of September 1979

[SEAL]

Attest:

Attesting Officer

LUTRELLE F. PARKER
Acting Commissioner of Patents and Trademarks